United States Patent
Tanimoto (10) Patent No.: US 7,310,115 B2
(45) Date of Patent: Dec. 18, 2007

(54) IMAGING DEVICE WITH BOOSTING CIRCUIT

(75) Inventor: Takashi Tanimoto, Gifu-ken (JP)

(73) Assignee: Sanyo Electric Co., Ltd., Osaka (JP)

( * ) Notice: Subject to any disclaimer, the term of this patent is extended or adjusted under 35 U.S.C. 154(b) by 740 days.

(21) Appl. No.: 10/402,193

(22) Filed: Mar. 28, 2003

(65) Prior Publication Data
US 2003/0193574 A1 Oct. 16, 2003

(30) Foreign Application Priority Data
Mar. 29, 2002 (JP) .............................. 2002-094745

(51) Int. Cl.
- H04N 5/225 (2006.01)
- H04N 9/04 (2006.01)
- H04N 5/235 (2006.01)
- H04N 5/228 (2006.01)

(52) U.S. Cl. ............... 348/372; 348/207.99; 348/222.1

(58) Field of Classification Search ................ 348/312, 348/372, 207.99, 222.1
See application file for complete search history.

(56) References Cited

U.S. PATENT DOCUMENTS

| | | | | |
|---|---|---|---|---|
| 5,095,226 A | * | 3/1992 | Tani | 327/540 |
| 5,648,766 A | * | 7/1997 | Stengel et al. | 340/870.39 |
| 5,777,508 A | * | 7/1998 | Sawanobori | 327/534 |
| 6,369,527 B1 | * | 4/2002 | Morrish | 315/383 |
| 6,476,371 B2 | | 11/2002 | Miida | |
| 6,525,614 B2 | * | 2/2003 | Tanimoto | 331/20 |
| 6,787,751 B2 | * | 9/2004 | Tanimoto | 250/208.1 |
| 6,798,274 B2 | * | 9/2004 | Tanimoto | 327/536 |
| 6,882,370 B2 | * | 4/2005 | Ishimoto | 348/372 |

OTHER PUBLICATIONS

Patent Abstracts of Japan, Publication No. 2001-218119, date of publication Aug. 10, 2001, priority date Feb. 4, 2000, Title: CCD Driver, Applicant: Sanyo Electric Co. Ltd.

* cited by examiner

*Primary Examiner*—Lin Ye
*Assistant Examiner*—Richard M Bemben
(74) *Attorney, Agent, or Firm*—Occhiuti Rohlicek & Tsao LLP (57) ABSTRACT

An imaging device that is activated quickly and prevents deterioration of an image signal. The imaging device includes a boosting circuit for boosting an input voltage to generate a boosted voltage. A solid state imaging device receives the boosted voltage and generates the image signal. A clock signal generation unit is connected to the boosting circuit to determine a timing for generating the image signal in correspondence with a vertical synchronization signal and a horizontal synchronization signal and to generate a boosting clock signal for operating the boosting circuit. The clock signal generation unit continuously generates the boosting clock signal during a predetermined period in which the imaging operation starts and, after the predetermined period, generates the boosting clock signal during at least part of a blanking period of the vertical synchronization signal and the horizontal synchronization signal.

12 Claims, 6 Drawing Sheets

IMAGING DEVICE WITH BOOSTING CIRCUIT

CROSS-REFERENCE TO RELATED APPLICATIONS

This application is based upon and claims the benefit of priority from the prior Japanese Patent Application No. 2002-094745, filed on Mar. 29, 2002, the entire contents of which are incorporated herein by reference.

BACKGROUND OF THE INVENTION

The present invention relates to an imaging device incorporating a boosting circuit for generating a boosted voltage.

Batteries are used as power supplies in imaging devices, such as digital cameras, that employ solid state imaging devices (CCD image sensors). A battery has a predetermined output voltage width. Thus, an imaging device is provided with a boosting circuit and a regulating circuit to drive the CCD image sensor.

Figure 1:
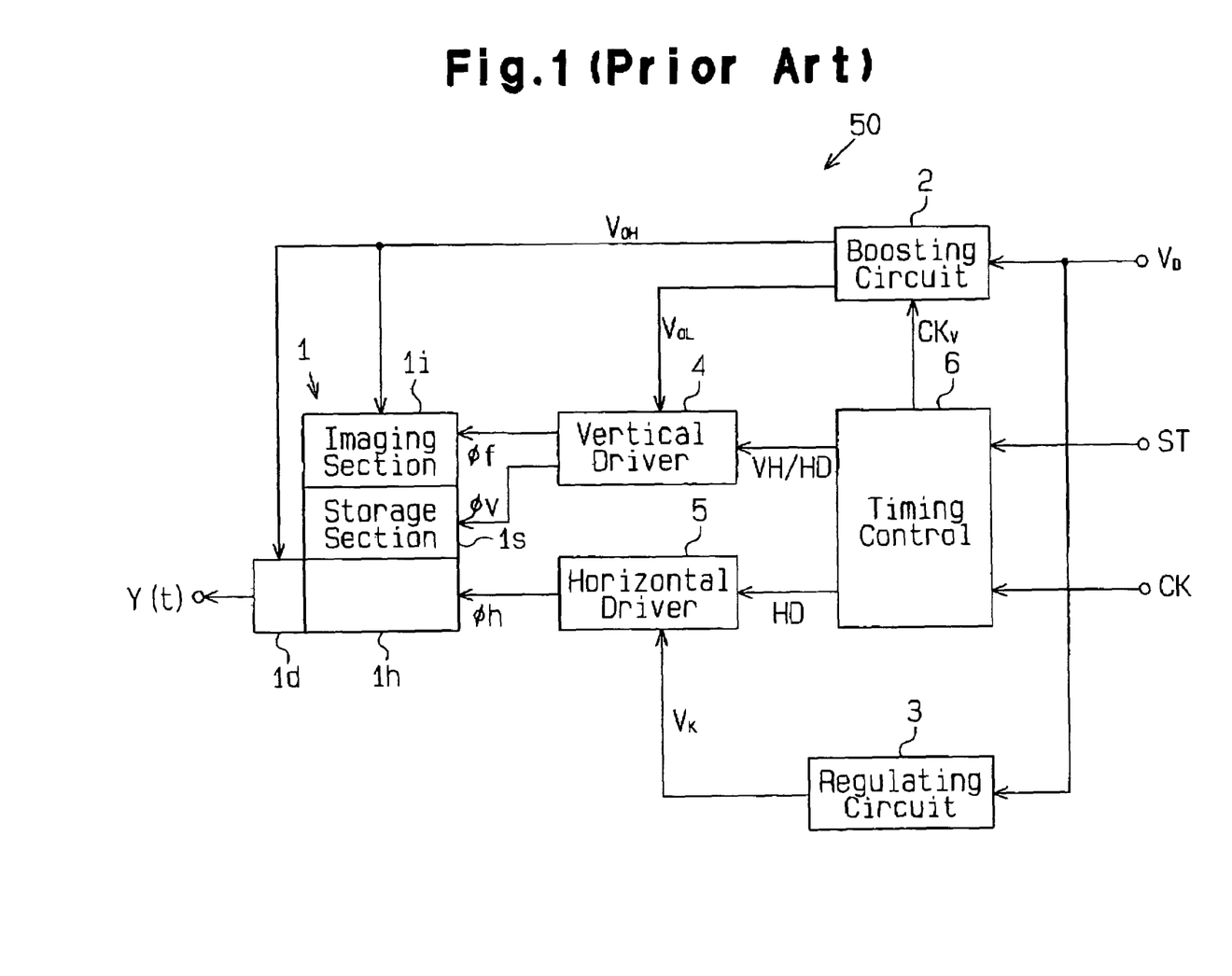
FIG. 1 is a schematic block diagram of an imaging device in the prior art.

FIG. 1 is a schematic block diagram of a prior art imaging device 50. The imaging device 50 includes a CCD image sensor 1, a boosting circuit 2, a regulating circuit 3, a vertical driver circuit 4, a horizontal driver circuit 5, and a timing control circuit 6. In the imaging device 50, the boosting circuit 2 is located at the input side of the vertical driver circuit 4. The boosting circuit 2 boosts a power supply voltage, which is supplied from a battery, to a predetermined voltage to generate a boosted voltage. The boosted voltage drives the CCD image sensor 1.

The CCD image sensor 1 has a light receiving section (plane), which includes a matrix of a plurality of light receiving pixels. Each light receiving pixel receives light at the light receiving plane and performs photoelectric conversion to generate information charges. The CCD image sensor 1 stores the information charges in the light receiving pixels and then sequentially transfers the information charges in accordance with clock signals from the vertical driver circuit 4 and the horizontal driver circuit 5. An output section 1d, which is located at the final stage of the transfer route, converts the information charges to a voltage having a certain value to generate an image signal Y(t). There are different types of CCD imaging devices that transfer the information charges in different ways. For example, the CCD image sensor 1 is a frame transfer type CCD image sensor, which includes an imaging section 1i, a storage section 1s, a horizontal transfer section 1h, and an output section 1d.

The boosting circuit 2, which is, for example a charge pump circuit, receives and boosts the power supply voltage VD, to generate a positive boosted voltage VOH (e.g., 5V) and a negative boosted voltage (e.g., −5V). The regulating circuit 3 receives the power supply voltage VD, generates a predetermined adjusted voltage (e.g., 2.0V to 2.5V) VK, and supplies the adjusted voltage VK to the horizontal driver circuit 5.

The vertical driver circuit 4 receives the boosted voltage VOL from the boosting circuit 2 and generates a frame transfer clock signal Øf and a vertical transfer clock signal Øv. The frame transfer clock signal Øf is provided to the imaging section 1i, and the vertical transfer clock signal Øv is provided to the storage section 1s. The frame transfer clock signal Øf and the vertical transfer clock signal Øv are generated in synchronism with a vertical synchronization signal VD and a horizontal synchronization signal HD, which are generated by the timing control circuit 6. This results in the information charges, which are stored in the imaging section 1i, simultaneously entering the storage section 1s. Further, the information charges in the storage section 1s are sequentially transferred to the horizontal transfer section 1h in units of single lines in synchronism with the horizontal synchronization signal HD.

The horizontal driver circuit 5 receives an adjusted voltage VK from the regulating circuit 3 and generates a horizontal transfer clock signal Øh and a reset clock signal Ør in accordance with the adjusted voltage VK. The horizontal transfer clock signal Øh is provided to the horizontal transfer section 1h, and the reset clock signal Ør is provided to the output section 1d. The horizontal transfer clock signal Øh and the reset clock signal Ør, which are generated in the horizontal driver circuit 5, are generated in synchronism with the horizontal synchronization signal HD. This results in a single line of information charges stored in the horizontal transfer section 1h being transferred to the output section 1d in units of single pixels during a single cycle (1H) of the horizontal synchronization signal HD.

The timing control circuit 6 includes a plurality of counters for counting a reference clock signal CK, which has a constant cycle. The timing control circuit 6 divides the reference clock signal CK by a predetermined ratio to generate the vertical and horizontal synchronization signals VD and HD. Further, the timing control circuit 6 receives a start trigger ST, which determines the timing for starting operation of the imaging device 50 (imaging mode). In, for example, an imaging device incorporated in electronic equipment, the start trigger signal ST is set because there is a standby mode. In the standby mode, the supply of power to the imaging device 50 is cut when a camera function of the electronic equipment is not in use. This reduces the power consumption of the electronic equipment.

The timing control circuit 6 generates a boosting clock signal CKV in response to the start trigger signal ST and provides the boosting clock signal CKV to the boosting circuit 2. Further, the timing control circuit 6 provides a boosting signal to the signal processing circuit (not shown), which performs a predetermined signal process on the output signal of the CCD image sensor 1. In other words, the timing control circuit 6 synchronizes the operation of each circuit in the imaging device 50 with the operation timing of the CCD image sensor 1.

Figure 2:
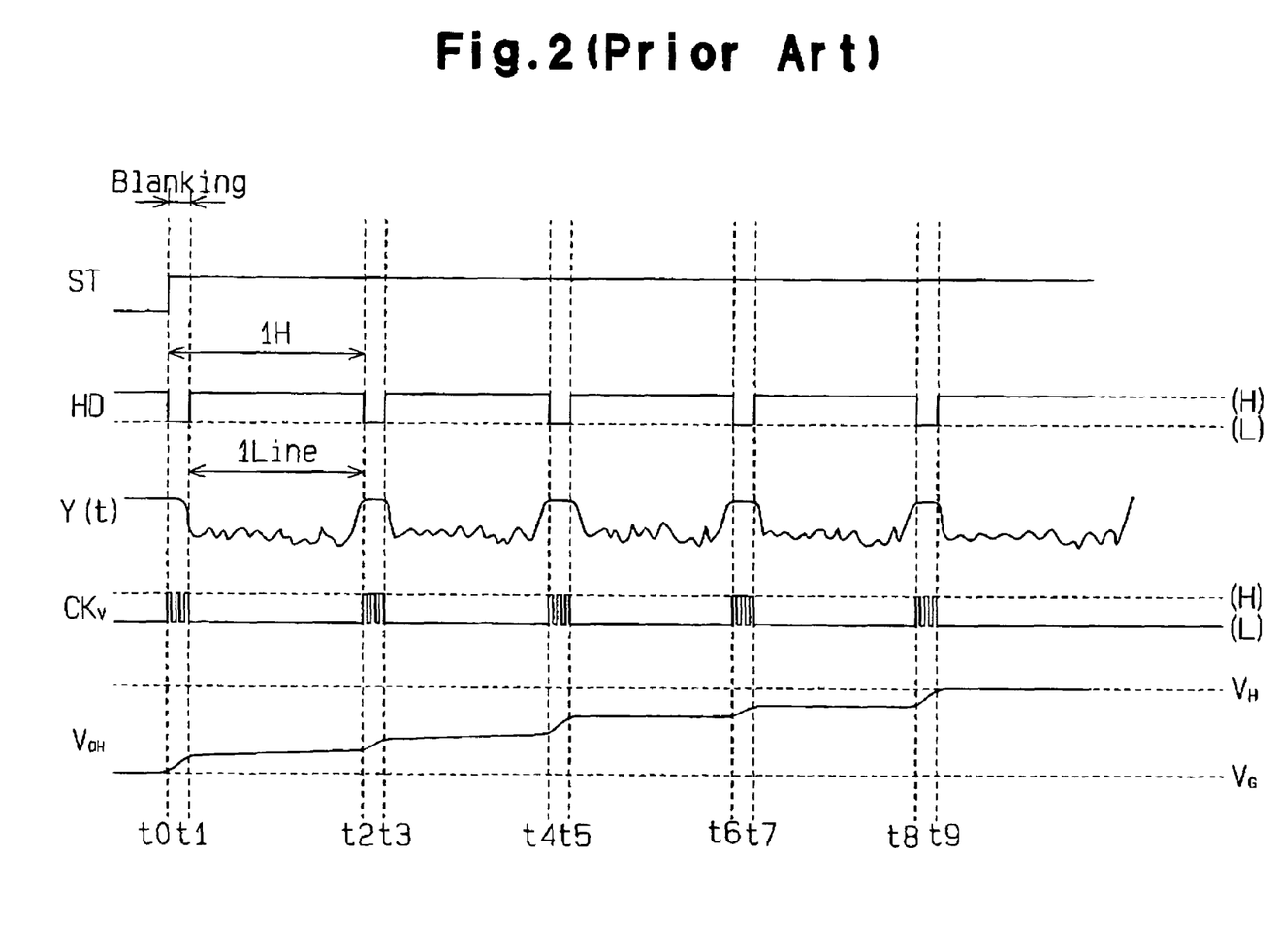
FIG. 2 is a timing diagram illustrating the operation of the imaging device of FIG. 1.

FIG. 2 is a timing chart illustrating an operation of the boosting circuit 2 that prevents the boosting operation of the boosting circuit 2 from affecting the image signal Y(t). In FIG. 2, (H) represents a high level, and (L) represents a low level.

The start trigger signal ST is a signal for determining the timing for supplying power to the imaging device 50. For example, the supply of power to the imaging device 50 is enabled when the start trigger signal ST is high and stopped when the start trigger signal ST is low. Accordingly, at timing t0 in FIG. 2, the electronic equipment exits the standby mode and starts the imaging operation.

The image signal Y(t) is the output signal of the CCD image sensor 1. The image signal Y(t) is output when the horizontal synchronization signal HD is high. The output of the image signal Y(t) is stopped when the horizontal synchronization signal HD is low (blanking period). The image signal Y(t) corresponding to a single line is output during a single cycle of the horizontal synchronization signal HD. In FIG. 2, the image signal Y(t) corresponding to a single line is output in a single cycle of the horizontal synchronization signal HD at timings t1 to t2, t3 to t4, t5 to t6, and t7 to t9. The image signal Y(t) is output before the boosted voltage VOH reaches a predetermined voltage VH and invalidated by the signal processing circuit of the following stage during timings t1 to t2, t3 to t4, t5 to t6 and t7 to t9.

The boosting clock signal CKV, which is a clock signal for controlling the boosting operation of the boosting circuit 2, is generated during the blanking period of the horizontal synchronization signal HD, that is, during timings t1 to t2, t3 to t4, t5 to t6, and t7 to t9. Accordingly, the boosting circuit 2, which receives the boosting clock signal CKV, performs a boosting operation during the blanking period of the horizontal synchronization signal HD. The boosting operation is also performed during the blanking period of the horizontal synchronization signal HD for a negative output voltage VOL.

In, for example, Japanese Laid-Open Patent Publication No. 2001-218119, the applicant has disclosed the imaging device 50 that generates the boosting clock signal CKV during the blanking period of the horizontal synchronization signal HD or the vertical synchronization signal VD and prevents noise, which is produced by the boosting clock signal CKV, from mixing with the image signal Y(t).

However, the boosting operation of the boosting circuit 2 is performed intermittently in the imaging device 50. Thus, the boosted voltage VOH increases gradually. As a result, a certain amount of time is required for the voltage supplied to a drive circuit to reach the desired voltage value. This interferes with increasing the activating speed of the imaging device.

SUMMARY OF THE INVENTION

One aspect of the present invention is an imaging device for performing an imaging operation to generate an image signal. The imaging device includes a boosting circuit for boosting an input voltage to generate a boosted voltage. A solid state imaging device is connected to the boosting circuit to receive the boosted voltage and generate the image signal. A clock signal generation unit is connected to the boosting circuit to determine a timing for generating the image signal in correspondence with a vertical synchronization signal and a horizontal synchronization signal and to generate a boosting clock signal for operating the boosting circuit. There is a blanking period for the vertical and horizontal synchronization signals. The clock signal generation unit continuously generates the boosting clock signal during a predetermined period after the imaging operation starts and after the predetermined period, generates the boosting clock signal during at least part of the blanking period of the vertical synchronization signal and the horizontal synchronization signal.

A further aspect of the present invention is an imaging device having a standby mode and an imaging mode. The imaging device includes a boosting circuit for boosting an input voltage to generate a boosted voltage. A solid state imaging device is connected to the boosting circuit to receive the boosted voltage and generate the image signal. A clock signal generation unit is connected to the boosting circuit to determine a timing for generating the image signal in correspondence with a vertical synchronization signal and a horizontal synchronization signal and to generate a boosting clock signal for operating the boosting circuit. There is a blanking period for the horizontal and vertical synchronization signals. The clock signal generation unit continuously generates the boosting clock signal during a predetermined period from when the standby mode is switched to the imaging mode and after the predetermined period, generates the boosting clock signal during at least part of the blanking period of the vertical synchronization signal and the horizontal synchronization signal.

A further aspect of the present invention is a method for controlling an imaging device that performs an imaging operation to generate an image signal. The imaging device includes a boosting circuit, which boosts an input voltage in accordance with a boosting clock signal to generate a boosted voltage, and a solid state imaging device, which receives the boosted voltage and generates the image signal in correspondence with a vertical synchronization signal and a horizontal synchronization signal. There is a blanking period for the vertical and horizontal synchronization signals. The method includes validating a start trigger signal to have the imaging device start the imaging operation, starting continuous generation of the boosting clock signal when the start trigger signal is validated, stopping the continuous generation of the boosting clock signal after a predetermined period from when the start trigger signal is validated, and after the predetermined period, generating the boosting clock signal during at least part of the blanking period of the vertical synchronization signal and the horizontal synchronization signal.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

In the drawings, like numerals are used for like elements throughout.

Figure 3:
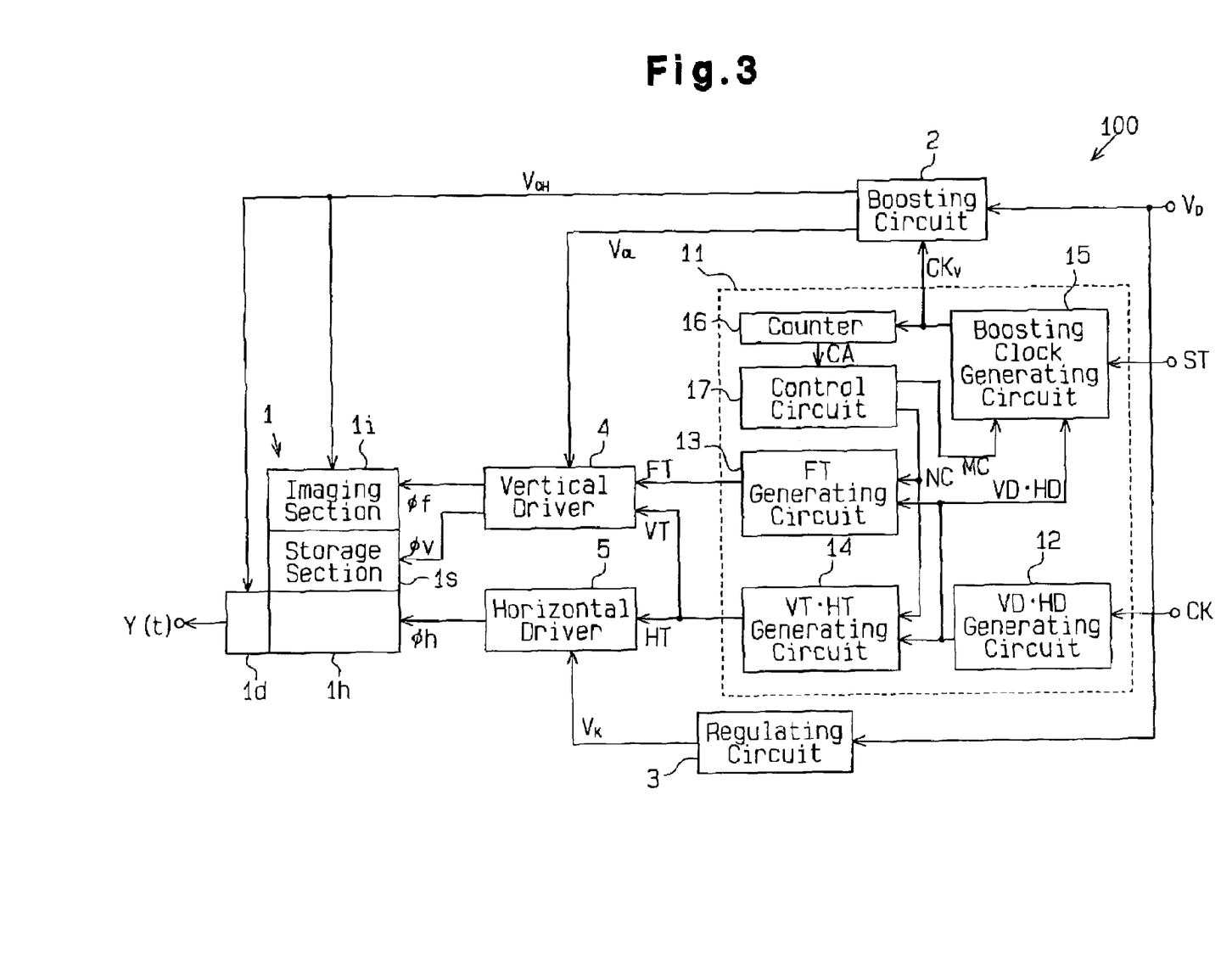
FIG. 3 is a schematic block diagram of an imaging device according to a first embodiment of the present invention.

FIG. 3 is a schematic block diagram of an imaging device 100 according to a first embodiment of the present invention. The imaging device 100 includes a CCD image sensor 1, a boosting circuit 2, a regulating circuit 3, a vertical driver circuit 4, a horizontal driver circuit 5, and a timing control unit 11, which is a clock signal generation unit.

In the first embodiment, a feature of the imaging device 100 is in that the boosting circuit 2 is continuously provided with the boosting clock signal CKV when the imaging operation is started. Further, modes for generating the boosting clock signal CKV are switched when the output voltage (boosted voltage) of the boosting circuit 2 increases to the required value.

The timing control unit 11 includes a VD/HD generation circuit 12, an FT generation circuit 13, a VT/HT generation circuit 14, a boosting clock signal generation circuit 15, a counter 16, and a control circuit 17.

The VD/HD generation circuit 12 includes a plurality of counters for counting a reference clock signal CK, which has a constant cycle, and dividing the reference clock signal CK by a predetermined ratio to generate a vertical synchronization signal VD and a horizontal synchronization signal HD. The FT generation circuit 13 receives the vertical synchronization signal VD and generates a frame shift timing signal FT, which is in synchronism with the vertical synchronization signal VD. The frame shift timing signal FT is a trigger signal that determines the timing of a frame transfer clock signal Øf, which is generated by the vertical driver circuit 4. The frame shift timing signal FT goes high during the blanking period of the vertical synchronization signal VD. Thus, clocking for the frame transfer clock signal Øf is performed during the blanking period of the vertical synchronization signal VD, and the information charges corresponding to a single image stored in an imaging section 1i are simultaneously transferred and output.

The VT/HT generation circuit 14 retrieves the vertical synchronization signal VD and the horizontal synchronization signal HD to generate a vertical transfer signal VD synchronized with the synchronization signal VD and a horizontal transfer timing signal HT synchronized with the synchronization signal HD. The vertical transfer timing signal VT is a trigger signal that determines the timing of a vertical transfer clock signal Øv, which is generated by the vertical driver circuit 4. The vertical transfer timing signal VT goes high in synchronism with the frame shift timing signal FT and the horizontal synchronization signal HD. Thus, the information charges transferred from the imaging section 1i are acquired in a storage section 1s, and the acquired information charges are transferred to a horizontal transfer section 1h in units of single lines and in synchronism with the horizontal synchronization signal HD.

The horizontal timing signal HT is a trigger signal that determines the timing of a horizontal transfer clock signal Øh, which is generated by the horizontal driver circuit 5. The horizontal transfer timing signal HT is generated in synchronism with the horizontal synchronization signal HD. Thus, the information charges stored in the horizontal transfer section 1h are sequentially transferred to an output section 1d in units of single pixels and in synchronism with the horizontal synchronization signal HD.

The boosting clock signal generation circuit 15 generates a boosting clock signal CKV in response to a start trigger signal ST, which is provided from an external device. The boosting clock signal CKV is a clock signal that controls the boosting operation of the boosting circuit 2 and is provided to the boosting circuit 2. The boosting circuit 2 performs the boosting operation when the boosting clock signal CKV is generated. The counter 16 counts the boosting clock signal CKV from when the start trigger signal ST goes high to generate a count signal (count value) CA and provides the count value CA to the control circuit 17.

The control circuit 17 compares the count value CA of the counter 16 with a predetermined target value. In accordance with the comparison result, the control circuit 17 generates a first control signal MC, which controls the mode for generating the boosting clock signal CKV, and provides the first control signal MC to the boosting clock signal generation circuit 15. The control circuit 17 provides a second control signal NC, which controls the timing for starting the generation of each type of timing signal, to the FT generation circuit 13 and the VT/HT generation circuit 14.

Figure 4:
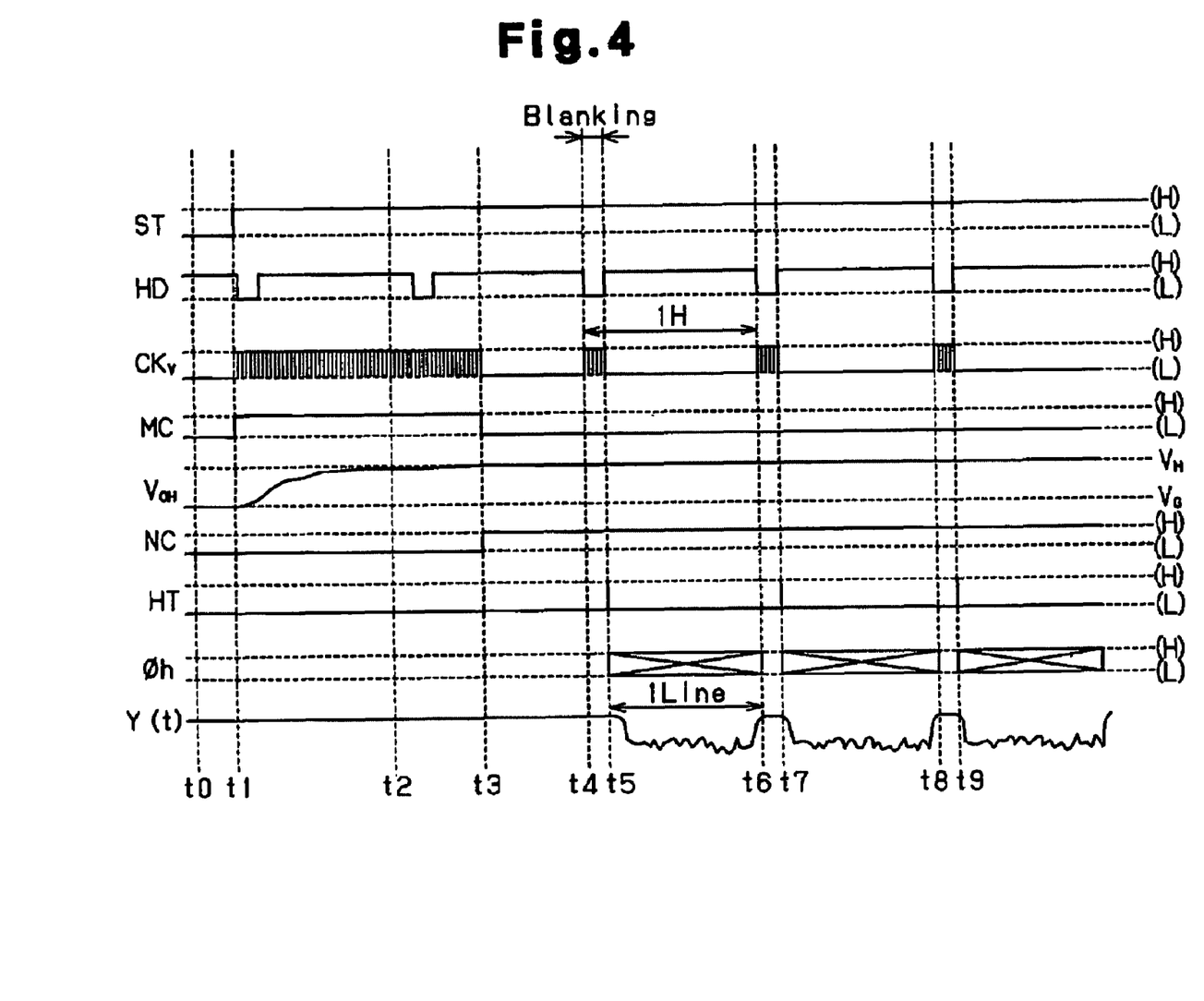
FIG. 4 is a timing diagram illustrating the operation of the imaging device of FIG. 3.

The operation of the imaging device 100 will now be discussed with reference to the timing chart of FIG. 4. At timing t0 in FIG. 4, the imaging device 100 is set in the standby mode and does not perform the imaging operation. At timing t1, the imaging device 100 exits the standby mode and starts the imaging operation (imaging mode). The boosting circuit 2 generates two types of boosted voltages, a positive voltage VOH and a negative voltage VOL. Only the positive boosted voltage VOH is shown in FIG. 4.

At timing t0 during which the imaging device 100 is set in the standby mode, the start trigger signal ST is low. In accordance with the low start trigger signal ST, the boosting clock signal CKV is also low and the boosted voltage VOH is equal to the ground voltage VG (e.g., 0V).

When the start trigger signal ST goes high at timing t1, the generation of the boosting clock signal CKV is started. Simultaneously with the generation of the boosting clock signal CKV, the counter 16 starts the counting operation. In accordance with the count operation, the first control signal MC goes high.

Then, when the count value CA reaches its target value at timing t3, the first control signal MC goes low. This temporarily stops the generation of the boosting clock signal CKV. The boosting clock signal generation circuit 15 continuously generates the boosting clock signal CKV from timing t1 in which the imaging operation is started to when the count value CA reaches the target value. Thus, the boosted voltage VOH increases immediately to a predetermined voltage VOH. The generation of the boosting clock signal CKV is temporarily stopped at timing t3 in which the boosted voltage VOH reaches voltage VH.

At timing t3, when the count value CA reaches the target value, the second control signal NC goes high. In the FT generation circuit 13 and the VT/HT generation circuit 14, which receive the high second control signal NC, the output of each type of timing signal is enabled. Thus, the output of each timing signal is started subsequent to timing t3. In other words, when the boosted voltage VOH is increasing, the image signal Y(t) is not output, and the image signal Y(t) is output after the boosted voltage VOH increases to a sufficient level.

Subsequent to timing t3, the boosting clock signal CKV is generated during a horizontal scan blanking period, or only during timings t4 to t5, t6 to t7, and t8 to t9. Further, the image signal Y(t) is output during the period excluding the blanking period, that is, during a horizontal scan period. This prevents noise components, which result from the generation of the boosting clock signal CKV, from mixing with the image signal Y(t).

In the first embodiment, the boosting clock signal CKV is continuously generated for a predetermined period when the imaging operation is started. After the predetermined period elapses, the boosting clock signal CKV is generated only during the blanking period of the horizontal synchronization signal HD. This prevents deterioration of the image signal Y(t) while increasing the activating speed of the imaging device 100. By positively performing the boosting operation of the boosting circuit 2 from timing t0 in which the imaging operation is started, the boosted voltage VOH goes high quickly. After the boosted voltage VOH stabilizes, boosting is performed only in the horizontal scan blanking period. This prevents noise components that are produced by the generation of the boosting clock signal CKV from mixing with the image signal Y(t).

Further, until the count value CA of the counter 16 reaches the target value, the output of timing signals from the FT generation circuit 13 and the VT/HT generation circuit 14 is stopped. This prevents unnecessary output of the image signal Y(t) and avoids unnecessary consumption of power by the vertical driver circuit 4 and the horizontal driver circuit 5.

The target value compared with the count value may be changed when necessary. Thus, if the period for continuously generating the boosting clock signal CKV is long enough, a margin is provided for activation of the imaging device 100. This provides a margin for the imaging device 100 to proceed from activation to the output of the image signal Y(t).

Figure 5:
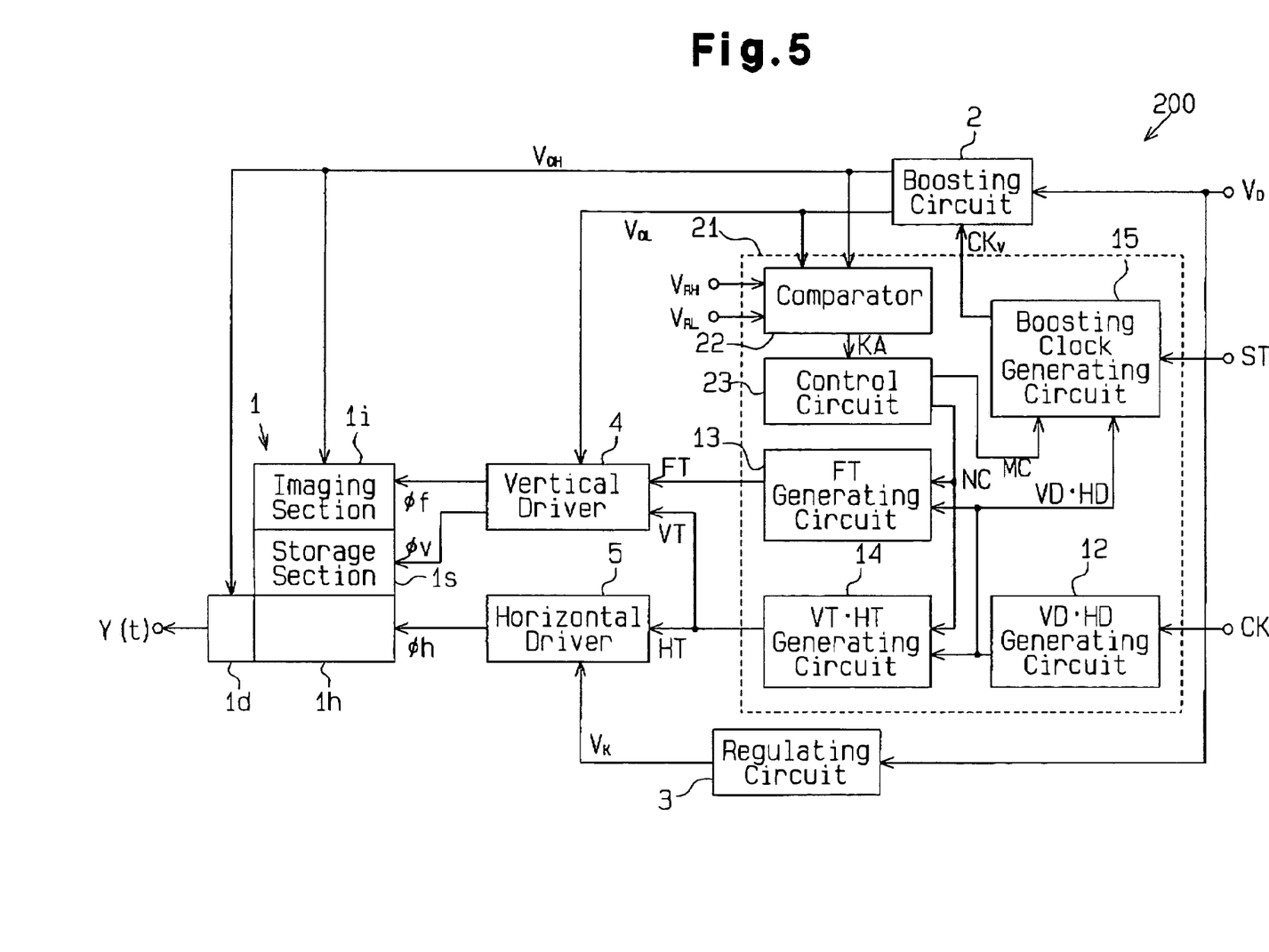
FIG. 5 is a schematic block diagram of an imaging device according to a second embodiment of the present invention.

FIG. 5 is a schematic block diagram of an imaging device 200 according to a second embodiment of the present invention. The second embodiment differs from the first embodiment in that a comparator 22, which compares the boosted voltage with a predetermined reference voltage, is used in lieu of the counter 16. In the imaging device 200, the mode for generating the boosting clock signal CKV is changed in accordance with the comparison result of the comparator 22.

The imaging device, 200 includes a CCD image sensor 1, a boosting circuit 2, a regulating circuit 3, a vertical driver circuit 4, a horizontal driver circuit 5, and a timing control unit (clock signal generation unit) 21. The timing control unit 21 includes the comparator 22, a control circuit 23, a boosting clock signal generation circuit 15, a VD/HD generation circuit 12, an FT generation circuit 13, and a VT/HT generation circuit 14.

The comparator 22 compares a positive output voltage VOH and a negative output voltage VOL of the boosting circuit 2 with two predetermined reference voltages VRH and VRL to generate a comparison signal KA, which is provided to the control circuit 23. The reference voltages VRH and VRL correspond to a positive voltage value VH and a negative voltage value VL that are respectively set in correspondence with the operational voltage at the vertical driver circuit 4 or the output section 1d of the CCD image sensor 1. The reference voltage VRH is slightly higher than the positive voltage VH, and the reference voltage VRL is slightly lower than the negative voltage VL.

The control circuit 23 detects whether the boosted voltages VOH and VOL have reached the associated predetermined voltages VH and VL in accordance with the comparison signal KA from the comparator 22. In accordance with the detection result, the control circuit 23 switches the mode for generating the boosting clock signal CKV of the boosting clock signal generation circuit 15 and switches the mode for outputting the timing signals of the FT generation circuit 13 and the VT/HT generation circuit 14.

Figure 6:
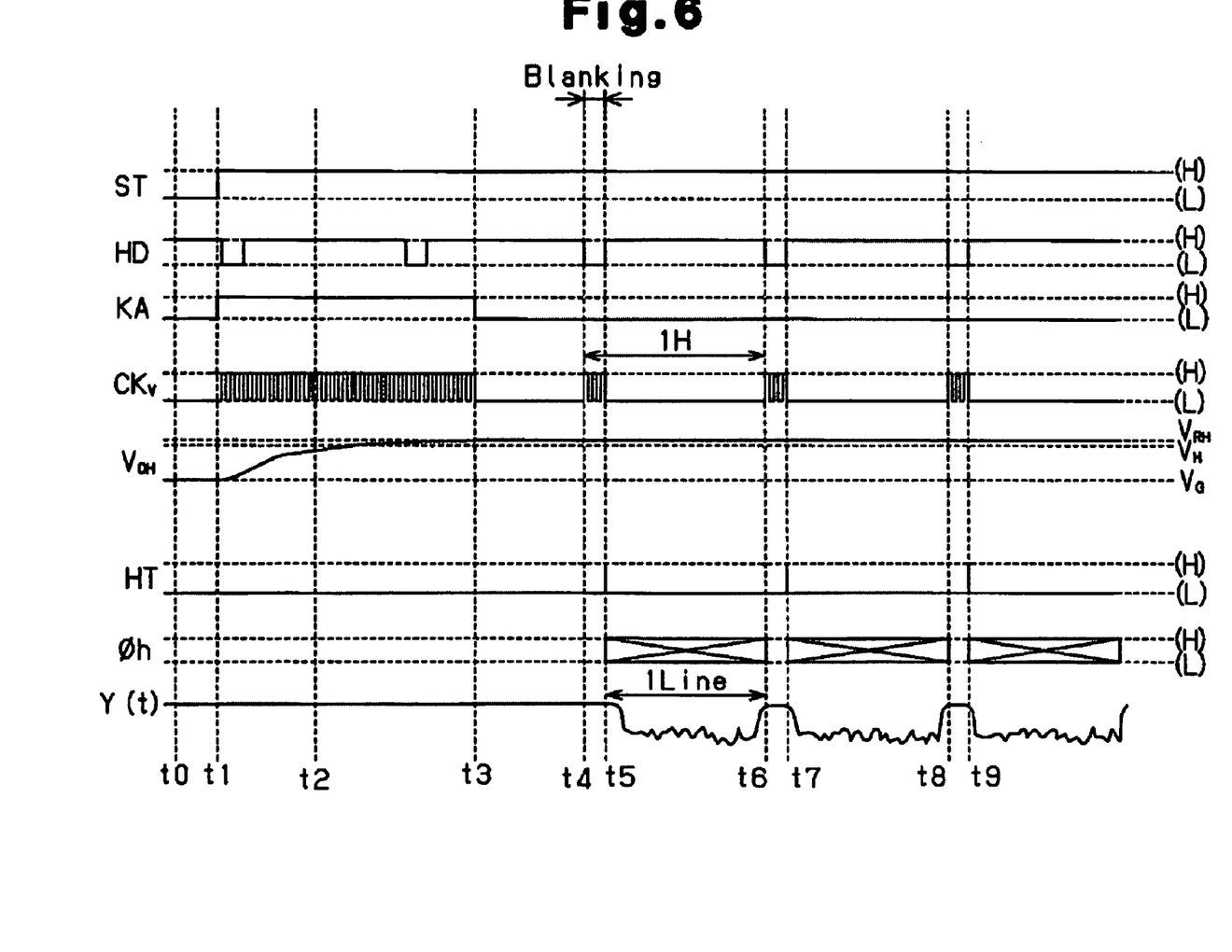
FIG. 6 is a timing diagram illustrating the operation of the imaging device of FIG. 5.

FIG. 6 is a timing diagram illustrating the operation of the imaging device 200. At timing t0 in FIG. 6, the imaging device 200 is in the standby mode and does not perform the imaging operation. At timing t1, the imaging device 200 exits the standby mode and starts the imaging operation.

At timing t0, the start trigger signal ST and the boosting clock signal CKV are low. Further, the output voltage VOH of the boosting circuit 2 is equal to the ground voltage VG[V] (0V).

When the start trigger signal ST goes high at timing t1, the comparison signal KA goes high in response to the high start trigger signal ST. When the comparison signal KA goes high, the boosting clock signal CKV is continuously generated. Further, the boosted voltage VOH is quickly increased to the desired voltage VH in accordance with the boosting clock signal CKV.

Then, when the boosted voltage VOH reaches a reference voltage VRH, the comparison signal KA goes low. When the comparison signal KA goes low, the boosting clock signal CKV is intermittently oscillated. Further, in response to the comparison signal KA, the FT generation circuit 13 and the VT/HT generation circuit 14 start outputting timing signals.

Subsequent to timing t3, the boosting clock signal CKV is generated during the horizontal scan blanking period, or only during timings t4 to t5, t6 to t7, and t8 to t9. Further, the image signal Y(t) is output during the period excluding the blanking period, that is, during the horizontal scan period. This prevents noise components, which result from the generation of the boosting clock signal CKV, from mixing with the image signal Y(t).

In the second embodiment, the timing control unit 21 compares the boosted voltage VOH with the reference voltage VRH and switches the mode for generating the boosting clock signal CKV in accordance with the comparison result. Thus, the second embodiment has the same advantages as the first embodiment.

In the second embodiment, the boosting operation of the boosting circuit 2 is positively performed from timing t1. After the boosted voltages VOH and VOL stabilize, boosting is performed only in the blanking period. This quickly increases the boosted voltage and prevents deterioration of the image signal.

In the second embodiment, the timing at which the positive boosted voltage VOH reaches the reference voltage VRH may differ from the timing at which the negative boosted voltage VOL reaches the reference voltage VOL. In such a case, the comparison signal KA goes low when the two boosted voltages VOH and VOL both reach the associated reference voltages VRH and VRL.

It should be apparent to those skilled in the art that the present invention may be embodied in many other specific forms without departing from the spirit or scope of the invention. Particularly, it should be understood that the present invention may be embodied in the following forms.

The boosting clock signal CKV may be generated during the blanking period of the vertical synchronization signal VD.

The CCD image sensor 1 may be any type of sensor as long as an image signal is generated with the boosted voltage of a boosting circuit.

The present examples and embodiments are to be considered as illustrative and not restrictive, and the invention is not to be limited to the details given herein, but may be modified within the scope and equivalence of the appended claims.

What is claimed is:

1. An imaging device for performing an imaging operation to generate an image signal, the imaging device comprising:
    a boosting circuit for boosting an input voltage to generate a boosted voltage;
    a solid state imaging device connected to the boosting circuit to receive the boosted voltage and generate the image signal;
    a drive circuit connected to the boosting circuit and the solid state imaging device to generate a drive clock signal with the boosted voltage, wherein the drive circuit provides the solid state imaging device with the drive clock signal to generate the image signal;
    a clock signal generation unit connected to the boosting circuit to determine a timing for generating the image signal in correspondence with a vertical synchronization signal and a horizontal synchronization signal and to generate a boosting clock signal for operating the boosting circuit, wherein there is a blanking period for the vertical and horizontal synchronization signals, wherein the clock signal generation unit includes,
a boosting clock signal generation circuit for generating the boosting clock signal, the boosting clock signal generation circuit generating the boosting clock signal during the blanking period of one of the vertical synchronization signal and the horizontal synchronization signal, and
a timing signal generation circuit coupled to the drive circuit, for providing a timing signal that sets a timing for providing the solid state imaging device with the drive clock signal from the drive circuit; and
a control circuit connected to the clock signal generation circuit and the timing signal generation circuit, for controlling the clock signal generation circuit to continuously generate a plurality of boosting clock signals during a predetermined period after the imaging operation starts and before the blanking period, wherein the predetermined period is longer than the blanking period of the vertical synchronization signal or the horizontal synchronization signal, and wherein the control circuit controls the timing signal generation circuit to start providing the drive circuit with the timing signal when the predetermined period has elapsed.

2. The imaging device according to claim 1, wherein the clock signal generation unit includes
a counter connected to the boosting clock signal generation circuit to count the number of clock pulses of the boosting clock signal and generate a count value;
wherein the control circuit is also connected to the counter to compare the count value with a predetermined target value and to change a generation mode of the boosting clock signal in accordance with the comparison result.

3. The imaging device according to claim 2,
wherein the control circuit controls the timing signal generation circuit to start providing the drive circuit with the timing signal when the count value reaches the predetermined target value.

4. The imaging device according to claim 1, wherein the clock signal generation unit includes:
a comparator for comparing the boosted voltage with a predetermined reference voltage to generate a comparison signal; and
a control circuit connected to the comparator and the boosting clock signal generation circuit to change a generation mode of the boosting clock signal with the boosting clock signal generation circuit in accordance with the comparison signal.

5. The imaging device according to claim 4, further comprising:
wherein the timing signal generation circuit starts providing the drive circuit with the timing signal when the boosted voltage reaches the predetermined reference voltage.

6. An imaging device having a standby mode and an imaging mode, the imaging device comprising:
a boosting circuit for boosting an input voltage to generate a boosted voltage;
a solid state imaging device connected to the boosting circuit to receive the boosted voltage and generate the image signal;
a drive circuit connected to the boosting circuit and the solid state imaging device to generate a drive clock signal with the boosted voltage, wherein the drive circuit provides the solid state imaging device with the drive clock signal to generate the image signal;
a clock signal generation unit connected to the boosting circuit to determined a timing for generating the image signal in correspondence with a vertical synchronization signal and a horizontal synchronization signal and to generate a boosting clock signal for operating the boosting circuit, wherein there is a blanking period for the horizontal and vertical synchronization signals, wherein the clock signal generation unit includes,
a boosting clock signal generation circuit for generating the boosting clock signal, the boosting clock signal generation circuit generating the boosting clock signal during the blanking period of one of the vertical synchronization signal and the horizontal synchronization signal, and
a timing signal generation circuit coupled to the drive circuit, for providing a timing signal that sets a timing for providing the solid state imaging device with the drive clock signal from the drive circuit; and
a control circuit connected to the clock signal generation circuit and the timing signal generation circuit, for controlling the clock signal generation circuit to continuously generate a plurality of boosting clock signals during a predetermined period from when the standby mode is switched to the imaging mode before the blanking period, wherein the predetermined period is longer than the blanking period of the vertical synchronization signal or the horizontal synchronization signal, and wherein the control circuit controls the timing signal generation circuit to start providing the drive circuit with the timing signal when the predetermined period has elapsed.

7. The imaging device according to claim 6, wherein the clock signal generation unit includes
a counter connected to the boosting clock signal generation circuit to count the number of clock pulses of the boosting clock signal from when the standby mode is switched to the imaging mode and generate a count value;
wherein the control circuit is also connected to the counter to stop the continuous generation of the plurality of boosting clock signals and enable the generation of the image signal when the count value reaches a predetermined target value.

8. The imaging device according to claim 6, wherein the clock signal generation unit includes:
a comparator for comparing the boosted voltage with a predetermined reference voltage to generate a comparison signal; and
a control circuit connected to the comparator and the boosting clock signal generation circuit to stop the continuous generation of the boosting clock signal and enable the generation of the image signal in accordance with the comparison signal when the boosted voltage reaches the predetermined reference voltage.

9. A method for controlling an imaging device that performs an imaging operation to generate an image signal, the imaging device including a boosting circuit, which boosts an input voltage in accordance with a boosting clock signal to generate a boosted voltage, and a solid state imaging device, which receives the boosted voltage and generates the image signal in correspondence with a vertical synchronization signal and a horizontal synchronization signal, a drive circuit, which provides the solid state imaging device with a drive clock signal to generate the image signal in response to a timing signal, wherein there is a blanking period for the vertical and horizontal synchronization signals, the method comprising:

validating a start trigger signal to have the imaging device start the imaging operation;

starting continuous generation of a plurality of boosting clock signals when the start trigger signal is validated;

stopping the continuous generation of the plurality of boosting clock signal after a predetermined period from when the start trigger signal is validated, wherein the predetermined period is longer than the blanking period of the vertical synchronization signal or the horizontal synchronization signal;

starting providing the drive circuit with the timing signal when the predetermined period has elapsed; and after the predetermined period, generating a boosting clock signal during the blanking period of one of the vertical synchronization signal and the horizontal synchronization signal.

10. The method according to claim 9, wherein said stopping the continuous generation of the boosting clock signal includes:

measuring the predetermined period by counting the number of the plurality of boosting clock signals from when the start trigger signal is validated.

11. The method according to claim 9, wherein said stopping the continuous generation of the boosting clock signal includes:

comparing the boosted voltage with a predetermined reference voltage; and stopping the continuous generation of the boosting clock signal when the boosted voltage reaches the predetermined reference voltage.

12. The method according to claim 9, further comprising:

starting the generation of the image signal after said stopping the continuous generation of the plurality of boosting clock signals.

* * * * *